US006272213B1

(12) United States Patent
Nightingale (10) Patent No.: US 6,272,213 B1
(45) Date of Patent: *Aug. 7, 2001

(54) METHOD AND SYSTEM FOR SERVICE ENGINEERING IN AN ADVANCED INTELLIGENT NETWORK

(75) Inventor: Peter D. Nightingale, Dallas, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/002,193

(22) Filed: Dec. 31, 1997

(51) Int. Cl.[7] ....................................... H04M 3/42
(52) U.S. Cl. ............................... 379/201; 379/207
(58) Field of Search ............................ 379/201, 242, 379/243, 207, 219, 220, 221, 229, 230, 211, 212

(56) References Cited

U.S. PATENT DOCUMENTS 5,323,452   6/1994  Dickman et al. ................. 379/201
5,469,500 * 11/1995  Satter et al. ..................... 379/201
5,583,920 * 12/1996  Wheeller, Jr. ................. 379/88.01
5,592,543 *  1/1997  Smith et al. ..................... 379/265
6,038,301 *  3/2000  Nightingale ..................... 379/201
6,047,059 *  4/2000  Lin et al. ......................... 379/230

FOREIGN PATENT DOCUMENTS 9631987   10/1996  (WO) .......................... H04Q/3/00

OTHER PUBLICATIONS

Newton's Telecom Dictionary, 8th Edition, p. 904, Nov. 1994.*

* cited by examiner

Primary Examiner—Ahmad Matar
Assistant Examiner—Bing Bui
(74) Attorney, Agent, or Firm—Baker Botts L.L.P.

(57) ABSTRACT

A method of engineering services in a telecommunications network includes storing an engineering file including a plurality of engineering attributes associated with a class of services. A service package is received for a service within the class of services. The engineering attributes of the engineering file are loaded into the service package.

18 Claims, 4 Drawing Sheets

METHOD AND SYSTEM FOR SERVICE ENGINEERING IN AN ADVANCED INTELLIGENT NETWORK

RELATED APPLICATIONS

This application is related to copending U.S. patent application Ser. No. 09/002,045, entitled "METHOD AND SYSTEM FOR PROVIDING SERVICE INFORMATION IN AN ADVANCED INTELLIGENT NETWORK"; U.S. patent application Ser. No. 09/001,365, entitled "METHOD AND SYSTEM FOR ENGINEERING A SERVICE IN AN ADVANCED INTELLIGENT NETWORK"; and U.S. patent application Ser. No. 09/002,192, entitled "METHOD AND SYSTEM FOR COMMUNICATING SERVICE INFORMATION IN AN ADVANCED INTELLIGENT NETWORK"

NOTICE

"Copyright 1997 DSC Communications Corporation." A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD OF THE INVENTION

This invention relates generally to the field of telecommunications, and more particularly to a method and system for service engineering in an advanced intelligent network (AIN).

BACKGROUND OF THE INVENTION

With the advent of the advanced intelligent network (AIN), it has become possible to rapidly design and introduce many new enhanced telecommunications services that provide subscribers with added flexibility and convenience in the use of telephone equipment. Examples of such services are free phone (FPH) services such as time dependent routing, calling card (CCD) services, virtual private network (VPN) services and personal 1-800 services.

In the advanced intelligent network, new services are typically designed in a service creation environment. After a service has been created, it needs to be bundled together, engineered, deployed and initially provisioned before it is capable of carrying live traffic on the network. The engineering process provides engineering data for the operating environment in which the service will be deployed.

Conventional methods for engineering a service in an advanced intelligent network suffer several disadvantages. For example, the engineering data is manually determined and entered by a programmer, which is time consuming, expensive and prone to mistakes. In addition, engineered services generally cannot be modified. As a result, engineered services cannot be corrected in case of mistakes or redeployed to other operating environments.

SUMMARY OF THE INVENTION

In accordance with the present invention, a method and system for service engineering are provided that substantially reduces or eliminates disadvantages and problems associated with prior systems and methods. In particular, the method and system stores attributes associated with a class of services in an engineering file that can be loaded into a service package to minimize engineering time and expense.

In one embodiment, the method of engineering a service in a telecommunications network includes storing an engineering file including a plurality of engineering attributes associated with a class of services. A service package is received for a service within the class of services. The engineering attributes of the engineering file are loaded into the service package.

Technical advantages of the present invention include providing an improved method of engineering a service in a telecommunications network. In particular, engineering attributes associated with a class of services are stored in an engineering file and together loaded into a service package for a service within the class of services. The class of services may include services of a particular type or a particular customer. Accordingly, a service package may be efficiently engineered for one or more telecommunications environments. Thus, engineering time and expense are reduced.

Other technical advantages will be readily apparent to one skilled in the art from the following figures, description, and claims.

BRIEF DESCRIPTION OF THE DRAWINGS

For a more complete understanding of the present invention, and its advantages thereof, reference is now made to the following description taken in conjunction with the accompanying drawings in which.

DETAILED DESCRIPTION OF THE INVENTION

Figure 1:
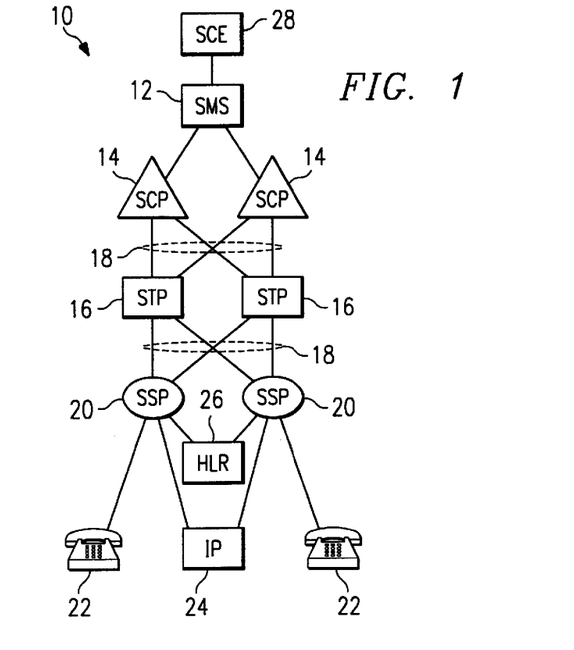
FIG. 1 is a block diagram illustrating an exemplary telecommunications network such as an advanced intelligent network (AIN) for use in connection with the present invention.

FIG. 1 is a block diagram illustrating an advanced intelligent network (AIN) 10 for use in connection with the present invention. The advanced intelligent network 10 includes a service management system (SMS) 12 that interfaces with a plurality of service control points (SCP) 14 and a plurality of signal transfer points (STP) 16 via an industry standard protocol, such as X.25. The service management system 12 provides network information, database management, and administrative support for the advanced intelligent network 10. The service management system 12 generally interfaces with service control points 14 for provisioning, database management, service control point application program management, and collecting traffic metering measurement data.

The service control points 14 may be directly linked to the signal transfer points 16 via a signaling system number 7

(SS7) link set 18. The signal transfer points 16 are further coupled through signaling system number 7 link set 18 to one or more service switching points 20, which perform switching and call handling functions in the network 10. The service control points 14 are transaction-based processing systems whose primary responsibility is to respond to queries from service switching points 20 for data needed to complete the routing of a call. The service switching points 20 are part of a publicly-switched telephone network (PSTN) and are coupled to the telephone service subscribers, which include wire-based telephones and wireless telephones 22, intelligent peripherals 24 and home location registers (HLR) 26.

A service creation environment 28 allows the creation and testing of service logic programs outside of the network 10. Completed service logic programs are downloaded to the service control points 14 and the signal transfer points 16 through the service management system 12 for execution on the network 10.

Figure 2:
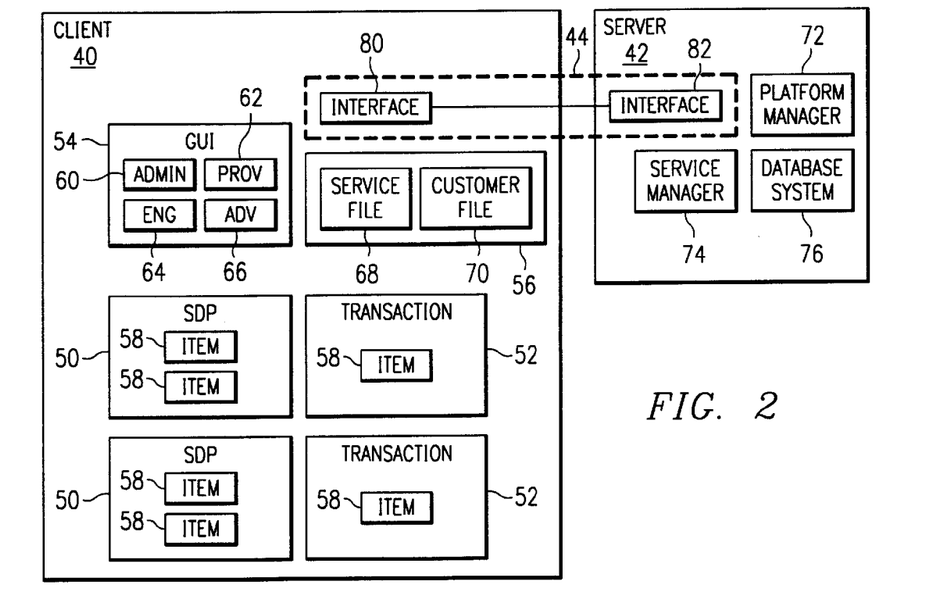
FIG. 2 is a block diagram illustrating details of client and server systems for service related internode communication in accordance with the present invention.

FIG. 2 is a block diagram illustrating details of a client system 40, a server system 42 and a network services interface 44 for service related internode communication in a telecommunications network. For the advanced intelligent network 10, the client system 40 may reside in the service management system 12 and the server system 42 may reside in each of the service control points 14. It will be understood that the client and server systems 40 and 42 are network centric and may reside in other suitable network elements capable of storing and processing data. For example, the client system 40 may reside in the service creation environment 28. The server system 42 resides in the service management system 12, the intelligent peripherals 24 and the home location register 26.

Referring to FIG. 2, the client system 40 includes a plurality of service definition packages (SDP) 50, a plurality of transactions 52, a graphical user interface (GUI) 54 and engineering files 56. The service definition packages 50, transactions 52, graphical user interface 54 and engineering files 56 comprise computer software that is loaded into memory and executed by the client system 40. It will be understood that the computer software may be otherwise suitably combined or divided for processing. Accordingly, labels of the packages, transactions, interfaces and files are for illustrative purposes and may be varied without departing from the scope of the present invention.

The service definition packages 50 and transactions 52 are each constructed of one or more items 58. The service definition package 50 is a transaction 52 that includes a specific set of ordered dependent items 58. The items 58 each have the same format for querying, provisioning and administering a service over the advanced intelligent network 10. As a result, a common interface may be used to query, provision and administer services in the advanced intelligent network 10.

Each item 58 includes discrete information blocks that identify a destination server system 42 for the item 58, an operation to be performed in the destination server system 42, a service on which the operation is to be performed and data for performing the operation. The operation may be a platform manager operation requesting information pertaining to destination server system 42, a database operation requesting modification of information pertaining to a service in the destination server system 42 or a service manager operation requesting administration of the service in the destination server system 42.

As shown by Tables 1–19 and described in more detail below, each item 58 may include eight fields of data. In this embodiment, a service field identifies the service to which the item 58 is directed. The service field forms the service information block of the item 58. An operation (Op) field identifies the operation that will be performed in response to the item 58. A type field identifies the type of operation. Thus, the operation and type fields together form the operation information block of the item 58. A destination (Dest) field identifies nodes or network elements to which the item 58 will be distributed. The destination field forms the destination information block of the item 58. The engineering description (EngDesc) field is used during service engineering to identify the type of item 58 and thus determine which of the fields may be engineered. The engineering description field may also be used in connection with the operation field to determine the operation to be performed by the item 58. The argument (arg1, arg2 and arg3) fields are the data portion of the item 58 and have specific meaning based on the operation of the item 58. For example, the argument fields may include a user ID and password for a login operation and database data for a provisioning operation. The argument fields form the data information block of the item 58. It will be understood that the items 58 may comprise other standard formats operable to identify the destination server system 42 for the item 58, the operation to be performed in the destination server system 42, the service on which the operation is to be performed and data for performing the operation.

The graphical user interface 54 is a main interface and includes an administration graphical user interface 60, a provisioning graphical user interface 62, an engineering graphical user interface 64 and an advanced engineering graphical user interface 66. As described in more detail below, the administration graphical user interface 60 displays all services distributed to network elements. Available administration actions are displayed and executed per request. The provisioning graphical user interface 62 allows the insertion, updating, modifying and deleting of records in the service databases of the network elements.

The engineering and advanced engineering graphical user interfaces 62 and 64 are used for service engineering. The engineering graphical user interface 64 enables the insertion, modification and deletion of items 58 in a service definition package 50. The advanced engineering graphical user interface 64 enables advanced operations in the service definition package 50.

As best shown by Table 1, the engineering and advanced engineering graphical user interfaces 62 and 64 graphically display the service definition package 50 as an array of items 58 with corresponding fields arranged in columns. As a result, a programmer can easily perceive relationships between items 58 of the service definition package 50, engineer the service definition package 50 for deployment and reengineer the service definition package 50 for disparate deployment. Accordingly, a service package may be efficiently engineered for one or more telecommunications environments. Thus, engineering time and expense are reduced.

The engineering graphical user interface 62 also loads relevant engineering files 56 into the service definition package 50. The engineering files 56 each include a plurality of engineering attributes associated with a class of services. The class of services may be services of a particular type, such as, for example, 1-800 services and services of a particular customer, such as, for example, a regional telephone company. In this embodiment, the engineering files 56 include one or more service files 68 and customer files 70. It will be understood that the engineering files 56 may include files for other suitable classes of service.

The server system 42 includes a platform manager 72, a service manager 74 and a database subsystem 76. The platform manager 72, service manager 74 and database subsystem 76 comprise computer software that is loaded into memory and executed by the server system 42. It will be understood that the computer software may be otherwise suitably combined or divided for processing. Accordingly, labels of the manager and system are for illustrative purposes and may be varied without departing from the scope of the present invention.

As described in more detail below, the platform manager 72 is operable to store and provide information pertaining to the server system 42. The service manager 74 is operable to administer services in the server system 42. The database subsystem 76 is operable to store, provision and provide information pertaining to a service.

The network services interface 44 includes a client interface 80 and a server interface 82. The client interface 80 is operable to transmit items 58 of the service definition packages 50 and other transactions 52 to the server interface 82. The server interface 82 is operable to process each item 58 and pass the identified operation to the platform manager 72, the service manager 74 or the database subsystem 76. In particular, if the operation is a platform manager operation, the server interface 82 passes the operation to the platform manager 72. If the operation is a service manager operation, the server interface 82 passes the operation to the service manager 74. If the operation is a database operation, the server interface 82 passes the operation to the database subsystem 76. In this way, the network services interface 44 is used to communicate all administrative, deployment, provisioning and other service information or messages in the advanced intelligent network 10. As a result, the expenses associated with using and maintaining disparate interfaces are reduced. In addition, as described in more detail below, the network services interface 44 may use an open protocol, such as, for example, the Common Object Request Broker Architecture (CORBA) ver. 2.0 protocol, that allows subscribers to remotely access the server interface 82 with a web browser to provision personal service data such as, for example, call forwarding information.

Figure 3:
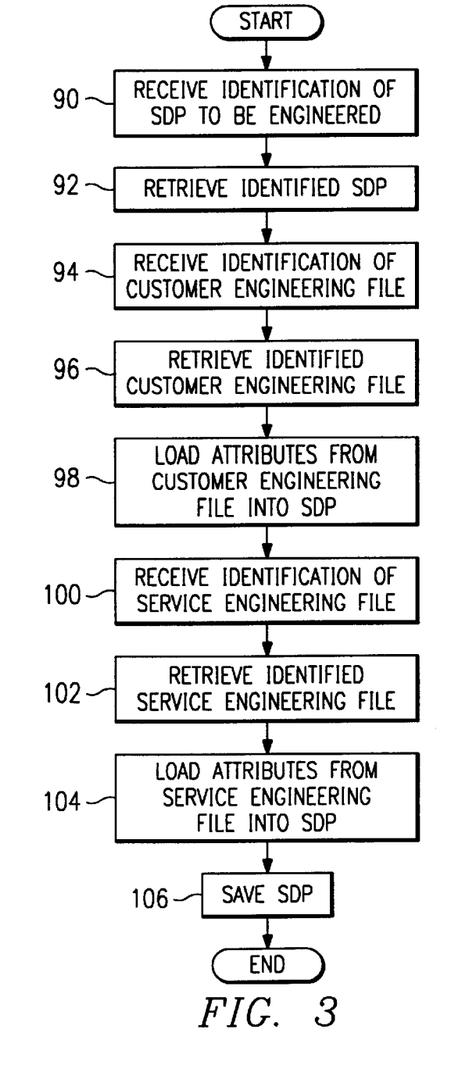
FIG. 3 is a flow diagram illustrating a computer method for engineering services in accordance with the present invention.

FIG. 3 is a flow diagram illustrating a computer method for engineering a service package in accordance with one aspect of the present invention. The service package may be the service definition package 50 or any other type of file including a service logic program or other set of instructions for performing a service in a telecommunications network. For the advanced intelligent network 10, the service definition package 50 is initially received from the service creation environment 28 and requires more processing before it can be used in a network element. The process of completing the service definition package 50 is called service engineering in which configuration data, database schema and other engineering attributes are loaded into the service definition package 50.

Referring to FIG. 3, the method begins at step 90 in which an identification of a service definition package 50 to be engineered is received. In one embodiment, the identification of the service definition package 50 is received from a programmer via the engineering graphical user interface 64. At step 92, the identified service definition package 50 is retrieved for engineering processing. The service definition package 50 may be in the format from which it was received from the service creation environment 28 or may have been previously engineered.

Proceeding to step 94, an identification of a customer engineering file 70 is received. In one embodiment, the identification of the customer engineering file 70 is received from the programmer via the engineering graphical user interface 64. In this embodiment, the engineering graphical user interface 64 may identify and display, as choices for selection, customer engineering files 70 having engineering attributes associated with the customer of the service definition package 50. The programmer may then select the desired customer engineering file 70 to have the attributes of that file 70 loaded into the service definition package 50. It will be understood that the customer engineering file 70 may be otherwise suitably identified without departing from the scope of the present invention. For example, the engineering graphical user interface 64 may automatically identify the customer engineering file 70 based on information provided in the service definition package 50 or by the programmer.

Next, at step 96, the engineering graphical user interface 64 retrieves the identified customer engineering file 70. At step 98, the engineering graphical user interface 64 loads engineering attributes from the customer engineering file 70 into the service definition package 50. The customer engineering attributes provide specific item configuration information for the customer of the service definition package 50. The item configuration information may include specific items 58 and specific services operations, operation types, destinations, data and other information for items 58.

Proceeding to step 100, an identification of a service engineering file 68 is received. In one embodiment, the identification of the service engineering file 68 is received from the programmer via the engineering graphical user interface 64. In this embodiment, the engineering graphical user interface 64 may identify and display, as choices for selection, service engineering files 68 having engineering attributes associated with the service of the service definition package 50. The programmer may then select the desired service engineering file 68 to have the attributes of that file 68 loaded into the service definition package 50. It will be understood that the service engineering file 68 may be otherwise suitably identified without departing from the scope of the present invention. For example, the engineering graphical user interface 64 may automatically identify the service engineering file 68 based on information provided in the service definition package 50 or by the programmer.

Next, at step 102, the engineering graphical user interface 64 retrieves the identified service engineering file 68. At step 104, the engineering graphical user interface 64 loads engineering attributes from the service engineering file 68 into the service definition package 50. The service engineering attributes provide specific item configuration information for the service of the service definition package 50. The item configuration information may include specific items 58 and specific service operations, operation types, destinations, data and other information for items 58.

Proceeding to step 106, the service definition package 50 with the customer and service engineering attributes is saved. Thus, attributes that are standard for a particular type of service or a particular customer may be stored in an engineering file 56 and loaded by programmer request or by default when engineering the service definition package 50. It will be understood that other engineering attributes associated with other classes of services may be likewise loaded into the service definition package 50.

Figure 4:
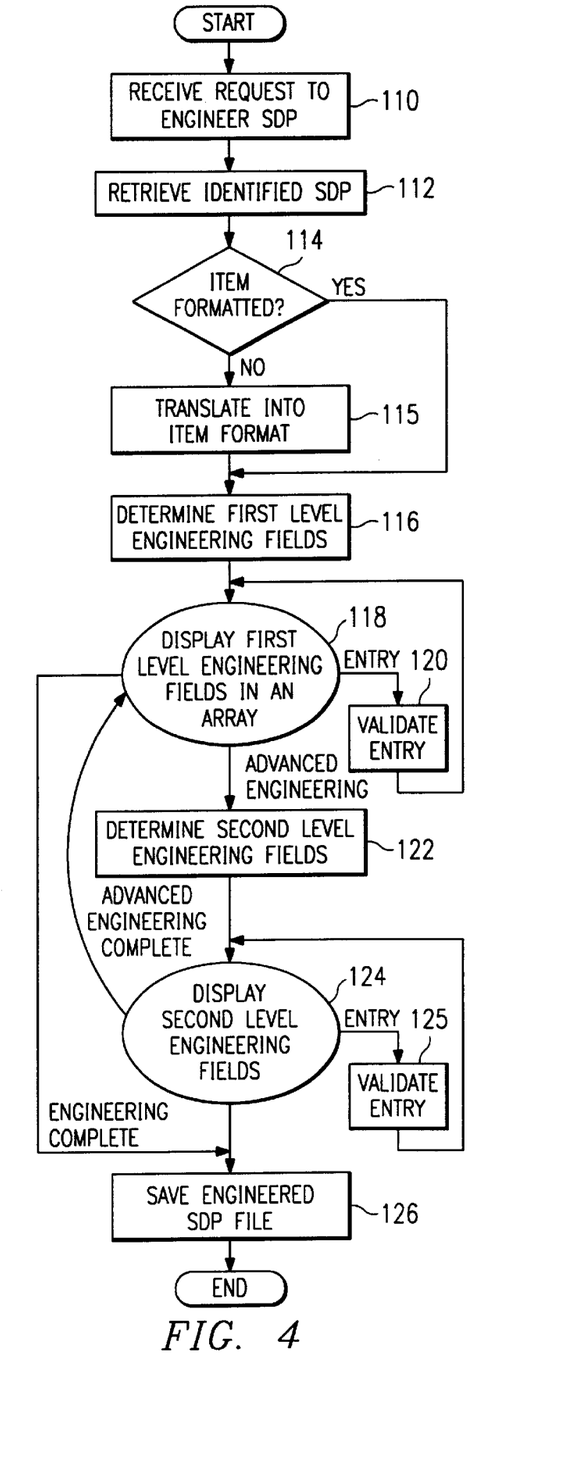
FIG. 4 is a flow diagram illustrating a computer method for editing services in accordance with the present invention.

FIG. 4 is a flow diagram illustrating a computer method for engineering services in accordance with one aspect of the present invention. Referring to FIG. 4, the method begins at step 110 in which the engineering graphical user interface 64 receives a request to engineer a service definition package 50. The service definition package 50 may be in the format from which it was received from the service creation environment 28 or may have been previously engineered. In the latter case, the service definition package 50 may be reengineered, or edited, for a disparate environment or to correct problems. At step 112, the engineering graphical user interface 64 retrieves the identified service definition package 50 for engineering processing.

Proceeding to decisional step 114, if the service definition package 50 is not yet formatted into items 58, such as, for example, when in the format from which the service definition package 50 was received from the service creation environment 28, the NO branch of decisional step 114 leads to step 115. At step 115, the engineering graphical user interface 64 translates the service definition package 50 into a set and order of items 58. In one embodiment, the service definition package 50 is translated by determining each action required by the service definition package 50 and providing an appropriate item 58 for the actions. It will be understood that the service definition package 50 may be otherwise translated as long as the resulting items 58 are capable of performing the service logic program or other instructions of the service definition package 50. Step 115 leads to step 116.

Returning to decisional step 114, if the service definition package 50 is item-formatted, the YES branch of decisional step 114 also leads to step 116. At step 116, the engineering graphical user interface 64 determines first level engineering fields of the items 58. The first level engineering fields may be fields of the items 58 that need to be engineered for deployment of the service. The first level engineering fields of each item 58 may be determined based upon the service definition field of the item 58. In this embodiment, a lookup table in the client system 40 defines the first level engineering fields for each service definition of the items 58.

Proceeding to state 118, the engineering graphical user interface 64 displays the first level engineering fields in an array. As best shown by Table 1, the array is arranged by item 58 and by related fields. In this embodiment, each item 58 is displayed in a separate row and related fields are displayed in the same column. As a result, a programmer can easily perceive relationships between operations in the service definition package 50.

From the display, the programmer may engineer, or edit, the first level engineering fields by entering a new value in the field. In response to an entry, state 118 leads to step 120 in which the entry is validated. In one embodiment, the entry is validated by determining if the characters of the entry match the character type of the field. If the entry is invalid, it will not be entered. If the entry is valid, it will be entered into the field. Step 120 returns to state 118 in which the first level engineering fields are displayed.

From the display, the programmer may also select advanced engineering. In response to an advanced engineering selection, state 118 leads to step 122. At step 122, the advanced engineering graphical user interface 64 determines second level engineering fields of the items 58. The second level engineering fields may be fields of the items 58 that optionally can be engineered for deployment of the service. The second level engineering fields of each item 58 may be determined based upon the service definition field of the item 58. In this embodiment, a lookup table in the client system 40 defines the second level engineering fields for each service definition of the items 58. In a particular embodiment, the second level engineering fields may include at least one field, such as, for example, the destination field, for each item 58.

Proceeding to state 124, the engineering graphical user interface 64 displays the second level engineering fields in the array. From the display, the programmer may engineer, or edit, the second level engineering fields by entering a new value in the field. In response to an entry, state 124 leads to step 125 in which the entry is validated. In one embodiment, the entry is validated by determining if the characters of the entry match the character type of the field. If the entry is invalid, it will not be entered. If the entry is valid, it will be entered into the field. Step 125 returns to state 124 in which the second level engineering fields are displayed. It will be understood that the first level engineering fields may be displayed with the second level engineering fields at state 124. It will be further understood that other suitable engineering levels may be likewise provided in addition to or in place of the first and second engineering levels.

In response to completion of advanced engineering, state 124 returns to state 118 in which the first level engineering fields are displayed. After engineering has been completed, the engineering complete branch of states 118 and 124 lead to step 126 in which the engineered service definition package 50 is saved. Step 126 leads to the end of the process. After the service definition package 50 has been engineered, it may be deployed to the server system 42 using the administration graphical user interface 60.

Figure 5:
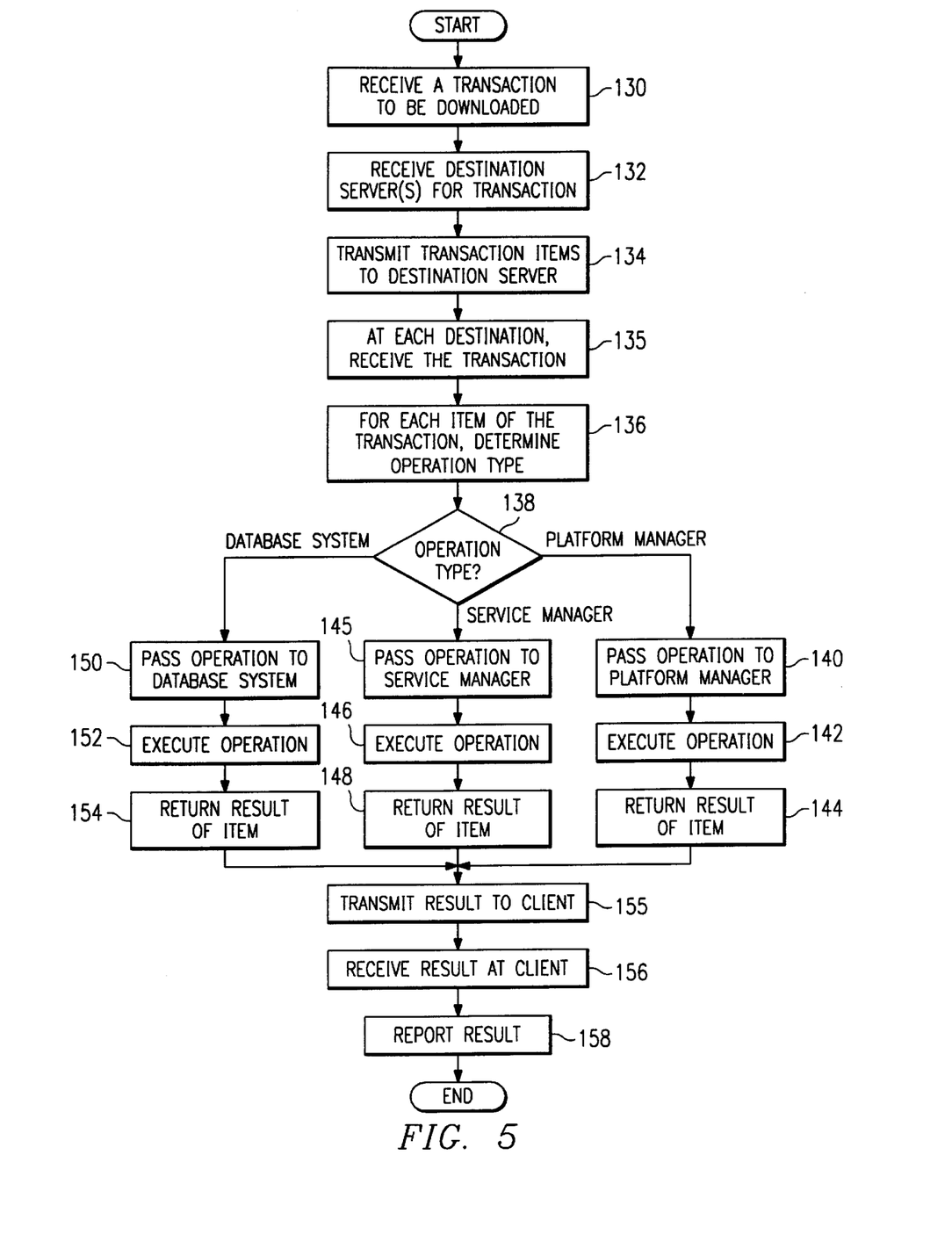
FIG. 5 is a flow diagram illustrating a computer method for communicating service information between nodes in accordance with the present invention.

FIG. 5 is a flow diagram illustrating a computer method for communicating service information between nodes in accordance with one aspect of the present invention. Referring to FIG. 5, the method begins at step 130 in which a transaction 52 to be downloaded is received. The transaction 52 may be received from the administration, provisioning or other graphical user interface. The transaction 52 is constructed of one or more items 58 and includes at least one of a platform manager operation requesting information pertaining to a server system, a database operation requesting modification of information pertaining to a service in the server system and a service manager operation requesting administration of the service in the server system.

Proceeding to step 132, the graphical user interface receives one or more destinations for the transaction 52. At step 134, the client interface 80 transmits the transaction 52 to the server interface 82 of the destination server systems 42. For the transaction 52, items 58 have the destination server system included within the destination information block are transmitted to the destination server system. This transaction may be transmitted to a variety of network elements with the items 58 being transmitted to appropriate network elements. Next, at step 135, the server interface 82, at each destination server system 42, receives the transaction 52. At step 136, for each item 58 of the transaction 52, the server interface 82 determines the type of operation.

Proceeding to decisional step 138, if the operation is a platform manager operation, the platform manager branch of decisional step 138 leads to step 140. At step 140 the server interface 82 passes the item 58 to the platform manager 72 for execution. At step 142, the platform manager 82 executes the item 58. Next, at step 144, the platform manager 72 returns a result of executing the item 58 to the server interface 82. Step 144 leads to step 155.

Returning to decisional step 138, if the operation is a service manager operation, the service manager branch of decisional step 138 leads to step 145. At step 145, the server interface 82 passes the item 58 to the service manager 74. At step 146, the service manager 74 executes the item 58. Next, at step 148 the service manager 74 returns a result of executing the item 58 to the server interface 82. Step 148 leads also to step 155.

Returning again to decisional step 138, if the operation is a database operation, the database branch of decisional step 138 leads to step 150. At step 150, the server interface 82 passes the item 58 to the database subsystem 76. At step 152, the database subsystem 76 executes the item 58. Next, at step 154 the database subsystem 76 returns a result of executing the item 58 to the server interface 82. Step 154 leads also to step 155.

At step 155, the server interface 82 transmits the result to the client interface 80. At step 156, the result is received at the client interface 80. Next, at step 158, the result is reported to the programmer via the graphical user interface. Step 158 leads to the end of the process. In this way, the network services interface 44 is used to communicate deployment, provisioning and other service information. As a result, expenses associated with using and maintaining disparate interfaces are reduced.

Figures 6A, 6B:
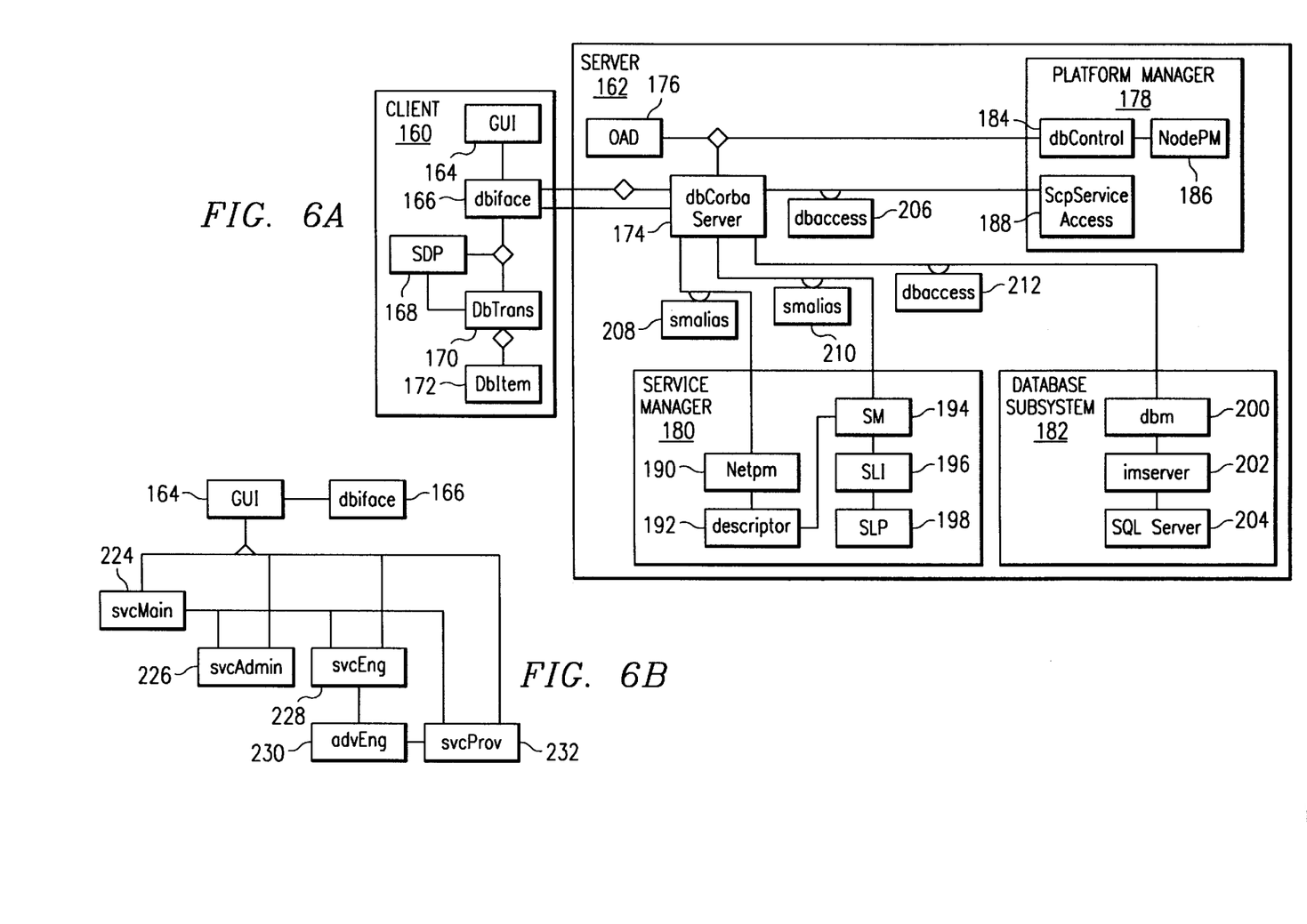
FIGS. 6A–B are object diagrams illustrating an object-oriented view of the client, server, and graphical user interface (GUI) of FIG. 2 in accordance with a particular embodiment of the present invention.

FIGS. 6A–B are object diagrams illustrating an object-oriented view of a client 160 and a server 162 in accordance with a particular embodiment of the present invention. Referring to FIG. 6A, the client 160 includes a graphical user interface (GUI) 164, a dbiface 166, a service definition package (SDP) 168, a DbTrans 170 and a DbItem 172. The server 162 includes a dbCorbaServer 174, an object activation demon (OAD) 176, a platform manager 178, a service manager 180 and a database subsystem 182. The platform manager 178 includes a dbcontrol object 184, a telecom platform object (NodePM) 186 and a services table (ScpServiceAccess) 188. The service manager 180 includes a network platform manager (NetPM) 190, a descriptor file 192, a service manager file 194, a service logic interpreter (SLI) 196 and a service logic program (SLP) 198. The database subsystem 182 includes a database manager 200, an imserver 202 and a structured query language (SQL) server 204.

For the client 160, the graphical user interface 164 is general representation of any graphical user interface using service deployment. Particular graphical user interface objects are described in more detail below in connection with FIG. 6B. The dbiface 166 is a client object that is used to interface with dbCorbaServer 174. The dbiface 166 uses standard I/O to interact with users either directly from the command-line or via the graphical user interface. The DbTrans 170 is a representation of the contents of the service definition package 168. The DbTrans 170 is a collection of DbItems 172. The DbItem is a single entry within the DbTrans object 170. The DbItem 172 contains the specific request that is to be processed by service deployment.

For the server 162, the dbCorbaServer 174 is a server capable of receiving requests for executing SQL requests. Implemented using the CORBA 2.0 standard, the dbCorbaServer 174 is instantiated dynamically when the OAD receives a request from a client. When the client instance is deleted, the server instance is also terminated. The object activation demon 176 provides the CORBA support to bind dbiface 166 to dbCorbaServer 174. The dbCorbaServer 174 receives DbItems 172 transmitted by the dbiface 166 as part of a DbTrans 170. The dbCorbaServer 174 instantiates a smalias and dbaccess object for use in performing the requested action. The dbCorbaServer 174 passes operations called by the DbItems 172 to the platform manager 178, the service manager 180 and the database subsystem 182.

In the platform manager 178, the dbcontrol object 184 is a telecom platform configurable element that registers dbCorbaServer 174 with the CORBA 2.0 OAD 176. The dbControl object 178 uses the site name and a key to register the dbCorbaServer 174. The dbCorbaServer 174 and dbControl object 178 communicate using a CORBA protocol. The telecom platform object 186 manages the network element states. The dbCorbaServer 174 registers for events with telecom platform object 186 via the dbControl object 184, which receives event notifications from the telecom platform object 186. The dbControl object 184 and telecom platform object 186 communicate using a distributed object messaging environment (DOME) protocol. The services table 188 records all services deployed on the network element. The dbCorbaServer 174 uses a service name to obtain a database name from the services table 188 via dbaccess 206, with actual access via the SQL Server 204. The services table 188 communicates using an OC/OS protocol.

In the service manager 180, the network platform manager 190 is a program that runs on the platform manager intelligent units (IPU) and is responsible for application management across the telecom platform nodes. The network platform manager 190 also performs operational actions on nodes and applications such as Remove, Restore, Enable, and Disable. The dbCorbaServer 174 uses smalias 208 to add and delete services to and from the network platform manager 190. The smalias 208 is implemented as a combination of SmAlias and/or BackSmAlias objects. The network platform manager 190 generates the descriptor file 192. The descriptor file 192 contains all information required for the managing of a configurable element. The descriptor file 192 is managed by the service manager file 194. The dbCorbaServer 174 uses smalias 210 to interface with the service manager file 194 for service state administration (e.g., query, create, lock, unlock, terminate). The service manager file 194 uses one or more service logic interpreters 196 to manage the service logic programs 198 (e.g., create, remove). The service logic program 198 runs in an advanced intelligent network node which usually directs all processing in a service switching point so as to provide a customer service. The service manager file 194, service logic interpreters 196 and service logic programs 198 communicate using the distributed object messaging environment (DOME) protocol.

In the database subsystem 182, the database manager 200 is used for replication on network elements on which the database is installed on multiple nodes. If the network element contains only a single database (e.g., a small SCP), the access goes straight to SQL Server 204. The dbCorbaServer 174 communicates with the database manager 200 using the distributed object messaging environment (DOME) protocol.

The database manager 200 resides only on the platform manager intelligent processing unit. The database manager 200 distributes updates to one or more imservers 202. The imserver 202 is the back half of database manager 200 and resides only on the application intelligent processing units. The database manager 200 communicates with the imservers 202 using the distributed object messaging environment (DOME) protocol. The imservers 202 sends SQL to the SQL server 204. The SQL server 204 is a Sybase SQL server and used for all Sybase database access. The imservers 202 communicates with the SQL server 204 using the OC/OS protocol.

Referring to FIG. 6B, the graphical user interface 164 sends commands to dbiface 166. The graphical user interface 164 includes an svcMain graphical user interface 224, an svcAdmin graphical user interface 226, an svcEng graphical user interface 228, an advEng graphical user interface 230 and an svcProv graphical user interface 232.

The svcMain graphical user interface 224 is implemented in TCL/TK and alternately displays the list of network elements currently using the specified port number and the set of intelligent processing units that compromise a selected network element. The svcMain graphical user interface 224 dispatches control to the svcAdmin graphical user interface 226, the svcEng graphical user interface 228 and the svcProv graphical user interface 232.

The svcAdmin graphical user interface 226 is implemented in TCL/TK and displays all services distributed to specified network elements. Available administration actions are displayed and executed per request. The svcEng graphical user interface 228 is implemented in TCL/TK and enables the insertion, modification, and deletion of items in a service definition package. These items consist of SQL requests (INSERTS, DELETES, CREATE DB, etc.). The advEng graphical user interface 230 is implemented in TCL/TK and enables the advanced operations of items in a service definition package. Advanced operations including adding more than one userID/passwords to a service definition package, changing destination of an item, configuring pegCounter/globalVar/TCAP value, etc. The advEng graphical user interface 230 uses svcProv object. The svcProv graphical user interface 232 is implemented in TCL/TK and allows the inserting, updating, modifying, and deleting of records in the database.

In operation, to connect the dbCorbaServer 174 on a given node with a dbiface 166 via OAD 176, the dbiface 166 issues a dbClient("server type", site) to OAD 176 (server type is ServDepl). The dbCorbaServer 174 has to have been registered previously with the OAD 176 for the connect to succeed. The way that the dbCorbaServer 174 gets registered with the OAD 176 is as follows: the dbcontrol process 184 is only concerned with ServDepl and has the path to dbCorbaServer 174. Dbcontrol 184 registers with telecom platform object 186 for event notification. When the node enters its information, dbcontrol 184 is notified and registers the dbCorbaServer 174 in the node with the OAD 176. More specifically, the client 160 broadcasts queries to the osagent process. The osagent process looks for registered receivers. This may either be an OAD 176 process or an actual server. The OAD 176 receives the request from the osagent process, and executes the server executable. For example, during unit testing, an engineer would not have to use the OAD 176, but could run the server executable. Running it manually registers it with the osagent. The client 160 on the other hand, first broadcasts to the osagent process, which will then direct it to all registered implementations. After the registration is done, dbiface 166 is able to connect with the dbCorbaServer 174.

The dbiface 166 is a C++ executable that uses standard I/O to accept requests from the user and to return the request. The same mechanism is used to interface with the graphical user interfaces, the executable is "opened" in the TCL/TK interface.

For the dbiface 166, the available commands are entered as a string which is parsed and performed. Invalid requests are rejected. Exemplary commands include maketrans, makePkg, itemAdd, itemAddFile, itemGet, itemModify, connect and sendDbTrans. The maketrans command is used to generate a new transaction. The makePkg command is used to generate a file that contains the current transaction. The itemAdd command is used to add a new item into the existing transaction. The itemAddFile command is used to add a new item that is saved in a file in the existing transaction. The itemGet command is used to query the existing transaction. The itemModify command modifies an item in the current transaction. The connect command specifies the sites for distributing the transaction. Previously specified sites are deleted. The sendDbTrans command distributes the current transaction to the sites specified by the connect command.

As previously described, the service definition package 168 is simply a database transaction 170 that includes a specific set of order dependent items 172. The server 162 assumes that a transaction 170 has been ordered correctly. There is a limit on the total size based on available memory. Exemplary items 172 for a service definition package 168 are illustrated in Table 1 as they are displayed to a programmer via the graphical user interface 164. For Table 1, (1 . . . n) indicates more than one item of the specified type, *o indicates that the item is optional, *prov data is of the form: <column name>,<column type>,'column value' and *sql data is a valid sql statement. The items 172 are normalized to minimize repetition of data in the service definition package 168.

TABLE 1

| Service | Type | Op | Dest | EngDesc | arg 1 | arg2, arg3 |
| --- | --- | --- | --- | --- | --- | --- |
| MASTER | password | addLogin | ALL | addLogin | <userid> | <password> |
| SCPSERACC | password | addLogin | ALL | addLogin | <userid> | <password> |
| * (1 ..n) | password | addUserid | ALL | addUserid | <userid> | <password> |
| <svcName> | svcAdmin | initSvc | ALL | initSvc | <dbname> | *none |
| SCPSERACC | sql | runsql | ALL | Slp | <slp> | *none |
| SCPSERACC | prov | insert | ALL | Selection-Criteria | Selection-Criteria | *prov data (does not include service name) |
| SCPSERACC | prov | insert | ALL | ScpServiceAccess | ScpServiceAccess | *prov data (does not include dbname, userid, or password) |
| SCPSERACC | prov | insert | ALL | globalConfig | globalConfig | *prov data (does not include service name) |

TABLE 1-continued

| Service | Type | Op | Dest | EngDesc | arg 1 | arg2, arg3 |
|---|---|---|---|---|---|---|
| SCPSERACC (1 ..n) | prov | insert | ALL | TcapConfig | TcapConfig | *prov data (does not include service name) |
| SCPSERACC (1 ..n) | prov | insert | ALL | SccpAddress | SccpAddress | *prov data (does not include service name) |
| SCPSERACC (1 ..n) | prov | insert | ALL | GlobalVar | GlobalVar | *prov data (does not include service name) |
| MASTER (*o) | sql | runsql | ALL | dropDB | *none | *none |
| MASTER (*o) | sql | runsql | ALL | createDB | <dev = #mb> {log ON <dev> = #mb} | *none |
| MASTER (*o) (1 ..n) | sql | runsql | ALL | sp_addlogin | *none | *none |
| MASTER (*o) | sql | runsql | ALL | sp_dboption | *none | *none |
| <svcName> (*o) (1 ..n) | sql | runsql | ALL | sp_adduser | *none | *none |
| <svcName> (*o) (1 ..n) | sql | runsql | ALL | grantALL | *none | *none |
| <svcName> (*o) (1 ..n) | sql | runsql | ALL | sp_role | *none | *none |
| <svcName> (*o) (1 ..n) | sql | runsql | ALL | dropObj | objType (table, proc, or trigger) | *object name |
| <svcName> (*o) (1 ..n) | sql | runsql | ALL | TABLE | *sql data | *table name |
| <svcName> (*o) (1 ..n) | sql | runsql | ALL | SP | *sql data | *sp name |
| <svcName> (*o) (1 ..n) | sql | runsql | ALL | TRIGGER | *sql data | *trigger name |
| <svcName> (*o) (1 ..n) | sql | runsql | ALL | grantObjects | *none | *none |
| <svcName> | svcAdmin | createCE | ALL | createCE | *none | *none |

General items 172 for the network services interface may include Login, Userid, Query Service States and Query Node States Transaction items. Exemplary Login item is illustrated in Table 2. In order for any transaction involving a database to be successfully completed, either a password item is included at the start of the transaction (preceding any database items) or was completed in a previous transaction. The specified userid and password are used to login into the service specified database, which is mapped from the entry in the ScpServiceAccess table 188. This is required either prior to or as part of a service definition package transaction, as well as any of the provisioning transactions.

TABLE 2

| Service | Type | Op | Dest | EngDesc | arg 1 | arg2, arg3 |
|---|---|---|---|---|---|---|
| <svcName> | password | addLogin | dest* | *none | userid | password |

Exemplary Userid item is illustrated in Table 3. The specified userid and password are created as part of a distribution of a service definition package 168.

TABLE 3

| Service | Type | Op | Dest | EngDesc | arg 1 | arg2, arg3 |
|---|---|---|---|---|---|---|
| <svcName> | password | addUserid | dest* | *none | userid | password |

Exemplary Query Service States item is illustrated in Table 4. This item queries the service state for the specified service on the specified node. Bypass indicates if an audit is to be performed. "*all" is used to indicate that the first inservice application IPU will be used to query the service state. "*bypass" specified for arg2 indicates that the audit is not to be performed. The result string is set to contain the service states.

TABLE 4

| Service | Type | Op | Dest | EngDesc | arg 1 | arg2, arg3 |
|---|---|---|---|---|---|---|
| <service> | svcAdmin | querySM | dest* | *none | <nodeName> | <Bypass> |

Exemplary Query Node States Transaction item is illustrated in Table 5. This item queries telecom platform for the node state information. The result string contains the node state information.

TABLE 5

| Service | Type | Op | Dest | EngDesc | arg 1 | arg2, arg3 |
|---|---|---|---|---|---|---|
| *none | svcAdmin | queryNodes | dest* | *none | *none | *none |

Service administration items 172 for the network services interface may include Initialize Service Download, Create Service, Remove Service, Unlock Service, Lock Service, Locked Forced Service, Terminate Service and Terminate Bypass Service items. Exemplary Initialize Service Download item is illustrated in Table 6. This item first confirms that the <svcName> configurable element is not currently in a descriptor file on any intelligent processing unit. If it is not found, the <svcName> and <dbName> are registered for subsequent items/transactions. Until a create service transaction is received, all requests involving the <svcName> will be performed through the "MASTER" service.

TABLE 6

| Service | Type | Op | Dest | EngDesc | arg 1 | arg2, arg3 |
|---|---|---|---|---|---|---|
| <svcName> | svcAdmin | initSvc | ALL | initSvc | <dbName> | *none |

Exemplary Create Service item is illustrated in Table 7. This will send a message to service manager file 194 to insert a new entry into the descriptor file to administer the specified service. It is always included during the deployment of a service switching point 20. It resets the flag set by the initSvc item to use the userid associated with the service name rather than the Master database.

TABLE 7

| Service | Type | Op | Dest | EngDesc | arg 1 | arg2, arg3 |
|---|---|---|---|---|---|---|
| <svcName> | svcAdmin | createCE | ALL | createCE | *none | *none |

Exemplary Remove Service item is illustrated in Table 8. This will remove the SCPConfig entries along with the <svcName> CE entry in the descriptor file.

TABLE 8

| Service | Type | Op | Dest | EngDesc | arg 1 | arg2, arg3 |
|---|---|---|---|---|---|---|
| SCPSERACC | sql | removeDB | dest* | *none | <svcName> | *none |
| <svcName> | svcAdmin | removeCE | dest* | *none | *none | *none |

Exemplary Unlock Service item is illustrated in Table 9. This will send a message to service manager file 194 to enable the configurable element created during the deployment of the service definition package 168.

TABLE 9

| Service | Type | Op | Dest | EngDesc | arg 1 | arg2, arg3 |
|---|---|---|---|---|---|---|
| <svcName> | svcAdmin | unlock | dest* | *none | *none | *none |

Exemplary Lock Service item is illustrated in Table 10. This will send a message to service manager file 194 to disable the configurable element created during the deployment of the service definition package 168.

TABLE 10

| Service | Type | Op | Dest | EngDesc | arg 1 | arg2, arg3 |
|---|---|---|---|---|---|---|
| <svcName> | svcAdmin | lock | dest* | *none | *none | *none |

Exemplary Locked Forced Service item is illustrated in Table 11. This will send a message to service manager file 194 to disable the configurable element created during the deployment of the service definition package 168 regardless of any error conditions.

TABLE 11

| Service | Type | Op | Dest | EngDesc | arg 1 | arg2, arg3 |
|---|---|---|---|---|---|---|
| <svcName> | svcAdmin | lockForced | dest* | *none | *none | *none |

Exemplary Terminate Service item is illustrated in Table 12. This will send a message to service manager file 194 to kill the configurable element created during the deployment of the service definition package 168.

TABLE 12

| Service | Type | Op | Dest | EngDesc | arg 1 | arg2, arg3 |
|---|---|---|---|---|---|---|
| <svcName> | svcAdmin | terminate | dest* | *none | *none | *none |

Exemplary Terminate Bypass item is illustrated in Table 13. This will send a message to service manager file 194 to kill the configurable element created during the deployment of the service definition package 168 regardless of any error conditions.

TABLE 13

| Service | Type | Op | Dest | EngDesc | arg 1 | arg2, arg3 |
|---|---|---|---|---|---|---|
| <svcName> | svcAdmin | terminate-Bypass | dest* | *none | *none | *none |

Service provisioning items 172 for the network services interface may include Table, Column, Insert, Delete, Update and Query items. Exemplary Table item is illustrated in Table 14. This will return a list of tables included in the database associated with <svcName>.

TABLE 14

| Service | Type | Op | Dest | EngDesc | arg 1 | arg2, arg3 |
|---|---|---|---|---|---|---|
| <svcName> | prov | tables | dest* | *none | *none | *none |

Exemplary Column item is illustrated in Table 15. This will return a list of columns included in the database associated with <svcName> in the table specified by <table name>. The data is returned in the format <column name>, <column length>, <column type>. The column name and column type returned are required for use in the remaining provisioning items.

TABLE 15

| Service | Type | Op | Dest | EngDesc | arg 1 | arg2, arg3 |
|---|---|---|---|---|---|---|
| <svcName> | prov | columns | dest* | *none | <tableName> | *none |

Exemplary Insert item is illustrated in Table 16. This will insert the specified data into the database associated with <svcName>. The data is in the form <colName>, <colType>, 'values'.

<svcName>. The data is in the form <colName>, <colType>, 'values'.

TABLE 16

| Service | Type | Op | Dest | EngDesc | arg 1 | arg2, arg3 |
|---------|------|-----|------|---------|-------|------------|
| <svcName> | prov | insert | dest | *none | *tableName | *prov data |

Exemplary Delete item is illustrated in Table 17. This will delete the specified data from the database associated with <svcName>. The data is in the form <colName>, <colType>, 'values'.

TABLE 17

| Service | Type | Op | Dest | EngDesc | arg 1 | arg2, arg3 |
|---------|------|-----|------|---------|-------|------------|
| <svcName> | prov | delete | dest | *none | *tableName | *prov data |

Exemplary Update item is illustrated in Table 18. This will insert the specified data into the database associated with <svcName>. The format for the data is <column name>, <column type>, '<column. value>' new, <column name>, <column type>, '<column value>'.

TABLE 18

| Service | Type | Op | Dest | EngDesc | arg 1 | arg2, arg3 |
|---------|------|-----|------|---------|-------|------------|
| <svcName> | prov | insert | dest | *none | *tableName | *prov data |

Exemplary Query item is illustrated in Table 19. This will query the database associated with <svcName> for the fields specified in data. The format for the data is: <queryColumn>, <queryColumnType> followed by optional where clauses <whereColumnname>, <whereColumnType>, '<whereColumnValue>'.

TABLE 19

| Service | Type | Op | Dest | EngDesc | arg 1 | arg2, arg3 |
|---------|------|-----|------|---------|-------|------------|
| <svcName> | sql | query | dest | *none | *tableName | *prov data |

For the client 160 and server 162, the interface may be defined by a transaction format IDL, a data type IDL and a processing IDL. Exemplary transaction format IDL, named ServPack.idl, is as follows:

```
#ifndef ServPack_idl
#define ServPack_idl
// service properties defined in this interface
interface dbtypes {
    // all item types are defined here
    enum ItemType {
        sql,
        prov,
        svcAdmin,
        password,
        fileSys,
        type 1,
        type2,
        type3
    };
// all operations are defined here in one place.
// Error checking is implemented in the client/server coding.
    enum Op {
        // valid operations for type "sql"
        runsql,
        removeDB,
        // valid operations for type "prov"
        insert,
        update,
        removeRec,
        tables,
        columns,
        query,
        next,
        // valid operations for type "svcAdmin"
        initSvc,
        createCE,
        removeCE,
        querySM,
        queryNodes,
        create,
        unlock,
        lock,
        lockForced,
        terminate,
        terminateBypass,
        // valid operations for type "password"
        addLogin,
        addUserid,
        // valid operations for type "fileSys"
        uudecode,
        execute,
        // Extra operations for future use
        op1,
        op2,
        op3,
        op4,
        op5
    };
//   Specifies the destination for each service item
//   This part will be used later on
    enum Dest {
        SMS,
        SCP,
        SCE,
        SMSSCP,
        SMSSCE,
        SCESCP,
        dest1,
        dest2,
        dest3
```

-continued

```
};
//   Specifies the engineer description for each service item
//   This part will be used later on
enum EngDesc {
    SLP,
    SMP,
    GlobalConfig,
    SelectionCriteria,
    TcapConfig,
    SccpAddress,
    ScpServiceAccess,
    dropDB,
    createDB,
    sp_addLogin,
    truncLog,
    addUser,
    grantALL,
    createTable,
    createSP,
    grantTables,
    engDesc1,
    engDesc2,
    engDesc3
    };
};       // ServProperties
typedef sequence<octet> ItemData;
//       structure for db item
struct DbItem {
    string              servicename;
    dbTypes::ItemType   type;
    dbTypes::Op         op;
    string              dest;
    string              engdesc;
    string              arg 1;
    string              arg2;
    string              arg3;
    string              spare;
};       // ServItem
typedef sequence <DbItem> DbItemList;
//       dbiface transaction structure defined here
struct DbTrans
    string              description;
    string              version;
    DbItemList          dbItems;
};       // ServicePackage
#endif
```
where:
- serviceName is used to identify the scope of the item. For example, it is used as the KEY to log into a database when "type" = "prov". It is used as the CE name sent to the TP when "type" = "svcAdmin".
- type is used to classify the item into a broader area {"sql", "prov", "pass-word", "svcAdmin", "fileSys", ... }
- dest is used to filter the item for execution on the NE {"SMS", "SCP", "HLR", "ISP", "<sitename>", ... }
- op refers to a specific operation that will be performed using the data in the associated item. ops are associated with a particular type. Refer to idl file "ServPack.idl" for details.
- engDesc is exclusively used for SDP'S. It is used to identify dbItems that require the service name be added to the arguments list (This avoids having the service name defined in multiple locations). It is also used to determine the order of item distribution.
- arg1, arg2, and arg3 are data items associated with the item.

Exemplary data type IDL, named ServType.idl, is as follows:

```
#ifndef ServType_idl
#define ServType_idl
// ----------------------------------------------------------------------
```

```
// interface ServDeplAttr
// the interface class for service deployment attributes
// ----------------------------------------------------------------------
interface ServDeplAttr {
    //   all error codes passed from server to client are declared
    //        here
    enum SdErr_e {
        NO_ERR,
        CLIENT_OBJ_NOT_BAKED,
        INVALID_INPUT_PARAM,
        SERVDEPL_BIND_ERR,
        // download (distribute) method error
        DISTRIBUTE_MEMORY_ERR,
        DISTRIBUTE_LIB_LOAD_ERR,
        DISTRIBUTE_LIB_UNLOAD_ERR,
        DISTRIBUTE_METHOD_ERR,
        // SM DAT errors
        SM_DAT_LOOKUP_SLI_ERR,
        SM_DAT_INSERT_APPL_HEADER_ERR,
        SM_DAT_INSERT_APPL_INST_HEADER_ERR,
        SM_DAT_LOOKUP_APPL_HEADER_ERR,
        SM_DAT_REMOVE_APPL_HEADER.ERR,
        SM_DAT_REMOVE_APPL_INST_HEADER_ERR,
        SM_DAT_UPDATE_APPL_HEADER_TESTFLAG_ERR,
        // requests to SM
        CREATE_REQ_TO_SM_ERR,
        UNLOCK_REQ_TO_SM_ERR,
        LOCK_REQ_TO_SM_ERR,
        TERMINATE_REQ_TO_SM_ERR,
        // response time out after SM request
        CREATE_WAIT_TIME_OUT,
        UNLOCK_WAIT_TIME,_OUT,
        LOCK_WAIT_TIME_OUT,
        TERMINATE_WAIT_TIME_OUT,
        // remove failure
        REMOVE_SP_EXEC_ERR,
        // memory alloc errors
        GET_NODES_INFO_MEMORY_ERR,
        GET_SERV_STATUS_FOR_ALL_SERV_MEMORY_ERR,
        GET_SERV_STATUS_FOR_SPECIFIC_SERV_MEMORY_
        ERR,
        // get service status error
        GET_SERV_STATUS_ERR,
        GET_SERV_STATUS_REQ_TO_SM_ERR,
        GET_SERV_STATUS_SM_INVALID_STATE_ERR,
        GET_SERV_STATUS_NODE_MISMATCH_ERR,
        // generic error codes
        GET_NODES_INFO_ERR,
        INVALID_SERV_STATE_CHG,
        ALL_NODES_NOT_ENABLED,
        UNDEFINED_ERR
    };
// ----------------------------------
// service related data types
// ----------------------------------
// enums for services
enum CreateFlag_e {CR_LOCKED, CR_UNLOCKED};
enum LockFlag_e {GRACEFUL, FORCED};
enum ServTestFlag_e {REALMODE, TESTMODE};
//   the following are the status values of the service defined
//        for SMS
//   Note: a service not existing on the SCP will be returned with
//        NOTFOUND
//   status, when the status of that specific service is asked
//        for.
enum ServStatus_e {
    NOTFOUND,
    INACTIVE,
    UNLOCKED,
    LOCKED,
    SHUTTINGDOWN
};
//   structure storing the name and status information for the
//        service
struct ServStatus {
    string       servName;
    ServStatus_e servStatus;
};
typedef sequence<ServStatus> ServStatusList;
```

```
// ------------------------------
// node related data types
// ------------------------------
enum NodeStatus_e {
    PM_OOS,
    OS_MIN,
    IN_SVC,
    UNDEFINED_NODESTATUS
};
enum NodeMode_e {
    ACTIVE_PM,
    STANDBY_PM,
    IPU_ACTIVE_STANDBY,
    STAND_ALONE,
    UNDEFINED_NODEMODE
};
// Type is determined in sdServer based on the applications
//
struct NodeInfo
    string      name;
    NodeStatus_e status;
    string      type;
    NodeMode_e mode;
};
typedef sequence<NodeInfo> NodeInfoList;
typedef sequence<string> NodeNameList;
}; // ServDeplAttr
#endif
Exemplary processing IDL, named ServDepl.idl, is as follows:
#iffidef ServDepl_idl
#define ServDepl_idl
// the following include defines the service package
#iffidef ServPack_idl
#include "ServPack.idl"
#define ServPack_idl
#endif
// the following include defines the ServDepl types
#iffidef ServType_idl
#include "ServType.idl"
#define ServType_idl
#endif
// ------------------------------------------------------------
// interface ServDepl
// the interface class for service deployment methods
// ------------------------------------------------------------
interface ServDepl {
    //   all the interface functions are defined below
    //   this function is not directly exported to the client
         interface.
    //   the function exported to the client is called download.
         boolean distribute (in string servName,
             in DbItem item,
             in boolean bypassInitCheck,
             out string dbString,
             out ServDeplAttr::SdErr_e sderr);
         boolean distItem (in DbItem item,
             in boolean bypassInitCheck,
             in boolean deployInProgress,
             out string dbString,
             out ServDeplAttr::SdErr_e sderr);
// boolean execDbItem (in DbItem item,
//       in boolean bypassInitCheck,
//       out string dbString,
//       out ServDeplAttr::SdErr_e sderr);
         boolean restoreDbmConn();
boolean broadcastNewSvcToImServ (in string servName, out
ServDeplAttr::SdErr_e sderr);
boolean broadcastRemoveSvcToImServ (in string servName, out
ServDeplAttr::SdErr_e sderr);
//   In future, this will also take the ApplHeader as a parameter
//   currently this function is not directly exported to the
     client interface.
//   boolean insertDescTcl (in string servName,
//       in ServDeplAttr::NodeNameList nodeList,
//       in boolean bypassInitCheck,
//       out ServDeplAttr::SdErr_e sderr);
//   In future, this will also take the ApplHeader as a parameter
//   currently this function is not directly exported to the
     client interface.
//   boolean removeDescTcl (in string servName,
//       in ServDeplAttr::NodeNameList nodeList,
//       in boolean bypassInitCheck,
//       out ServDeplAttr::SdErr_e sderr);
    boolean create (in string servName,
        in ServDeplAttr::CreateFlag_e flag,
        in ServDeplAttr::NodeNameList nodeList,
        in boolean bypassInitCheck,
        out ServDeplAttr::SdErr_e sderr
    boolean unlock (in string servName,
        in ServDeplAttr::NodeNameList nodeList,
        in boolean bypassInitCheck,
        out ServDeplAttr::SdErr_e sderr);
    boolean lock (in string servName,
        in ServDeplAttr::LockFlag_e flag,
        in ServDeplAttr::NodeNameList nodeList,
        in boolean bypassInitCheck,
        out ServDeplAttr::SdErr_e sderr);
    boolean terminate (in string servName,
        in ServDeplAttr::NodeNameList nodeList,
        in boolean bypassInitCheck,
        out ServDeplAttr::SdErr_e sderr);
    boolean remove (in string servName,
        in boolean remServDatabase,
        in boolean bypassInitCheck,
        out ServDeplAttr::SdErr_e sderr);
    boolean getServiceStatus (in string servName,
        out ServDeplAttr::ServStatusList servStatusList,
        in string nodeName,
        in boolean bypassInitCheck,
        out ServDeplAttr::SdErr_e sderr);
    boolean getNodeInfoList (out ServDeplAttr::NodeInfoList
nodeInfoList,
        out ServDeplAttr::SdErr_e sderr);
    boolean changeServMode (in string servName,
        in ServDeplAttr::ServTestFlag_e flag,
        in ServDeplAttr::NodeNameList nodeList,
        in boolean bypassInitCheck,
        out ServDeplAttr::SdErr_e sderr);
    boolean dbQuery (in string servName,
        in string dbParams,
        out string dbOutput);
    boolean servVersion (out string version);
    boolean getNodeType (out string nodeType);
    boolean getSiteName (out string siteName);
}; // interface ServDepl
#endif
```

Although the present invention has been described with several embodiments, various changes and modifications may be suggested to one skilled in the art. It is intended that the present invention encompass such changes and modifications as fall within the scope of the appended claims.

What is claimed is:

1. A method of engineering a service in a telecommunications network, comprising the steps of:

storing an engineering file including a plurality of engineering attributes associated with a class of services;

receiving a service definition package for a service within the class of services, the service definition package including executable computer software, the service definition package having items operating as a common interface for querying, provisioning, and administering a service over an advanced intelligent network; and loading the engineering attributes of the engineering file as an item into the service definition package.

2. The method of claim 1, wherein the class of services are services of a particular type.

3. The method of claim 1, wherein the class of services are services of a particular customer.

4. The method of claim 1, further comprising the step of editing the engineering attributes loaded into the service definition package.

5. The method of claim 1, wherein the service definition package is received from a service creation environment of the advanced intelligent network.

6. The method of claim 5, wherein the service definition package is received at a service management system of the advanced intelligent network and the engineering attributes are loaded into the service definition package at the service management system.

7. The method of claim 1, further comprising the step of storing the service definition package with the loaded attributes as a series of items, each item having a standard format.

8. The method of claim 7, wherein each item includes a first, a second, a third and a fourth information block, the step of storing the service definition package with the loaded attributes in the standard format further comprising for each item the steps of:

identifying in the first information block a destination system for the item;

identifying in the second information block an operation to be performed in the destination system;

identifying in the third information block a service on which the operation is to be performed; and identifying in the fourth information block data for performing the operation.

9. A method of engineering a service telecommunications network, comprising the steps of:

storing a plurality of engineering files, each file including a plurality of engineering attributes associated with a class of services;

receiving a service definition package within at least one of the classes of services, the service definition package including executable computer software, the service definition package having items operating as a common interface for querying, provisioning, and administering a service over an advanced intelligent network; and loading into the service definition package as an item the engineering attributes of at least one engineering file including engineering attributes associated with the class of service of the service definition package.

10. The method of claim 9, further comprising the steps of:

automatically determining each engineering file including engineering attributes associated with the class of service of the service definition package;

displaying for selection each engineering file including engineering attributes associated with the class of service of the service definition package;

receiving a selection of at least one engineering file; and loading into the service definition package the engineering attributes of the selected engineering file.

11. The method of claim 9, further comprising the steps of:

automatically determining each engineering file including engineering attributes associated with the class of service of the service definition package; and automatically loading into the service definition package the engineering attributes of each engineering file including engineering attributes associated with the class of service of the service definition package.

12. The method of claim 9, wherein at least one of the classes of services is services of a particular type.

13. The method of claim 9, wherein at least one of the classes of services is services of a particular customer.

14. The method of claim 9, further comprising the step of editing the engineering attributes loaded into the service definition package.

15. The method of claim 9, wherein the service definition package is received from a service creation environment of an advanced intelligent network.

16. The method of claim 15, wherein the service definition package is received at a service management system of the advanced intelligent network and the engineering attributes are loaded into the service definition package at the service management system.

17. The method of claim 9, further comprising the step of storing the service definition package with the loaded attributes as a series of items, each item having a standard format.

18. The method of claim 17, wherein each item includes a first, a second, a third and a fourth information block, the step of storing the service definition package with the loaded attributes in the standard format further comprising for each item the steps of:

identifying in the first information block a destination system for the item;

identifying in the second information block an operation to be performed in the destination system;

identifying in the third information block a service on which the operation is to be performed; and identifying in the fourth information block data for performing the operation.

* * * * *